Dec. 8, 1925.  G. F. ARMSTRONG  1,564,397
PNEUMATIC TUBE
Filed May 29, 1923

Witnesses:

Inventor.
George F. Armstrong
By his Att'y

Patented Dec. 8, 1925.

1,564,397

UNITED STATES PATENT OFFICE.

GEORGE F. ARMSTRONG, OF RUTHERFORD, NEW JERSEY.

PNEUMATIC TUBE.

Application filed May 29, 1923. Serial No. 642,237.

*To all whom it may concern:*

Be it known that I, GEORGE F. ARMSTRONG, a citizen of the United States, residing in Rutherford, in the county of Bergen and State of New Jersey, have invented certain new and useful Improvements in Pneumatic Tubes, of which the following is a specification.

This invention relates to the inner tubes of pneumatic tires of the clincher type though it is noted that the invention is not limited to this particular type of tire nor in some respects even to tires.

One object of the invention is to provide an inner tube of this kind in which the tube body is prevented from being caught between the toes of the shoe of the tire.

Another object of the invention is to provide a tube of this kind which is resistant enough to resist the chafing wear of the toes and the rim during the life of the tube.

Another object of the invention is to provide for a tire of this kind, or for general application, an improved slippery rubber which will minimize friction on the rubber, thus making for long life and easy manipulation.

Another object of the invention is to eliminate the usual "flap" or "liner" such as is generally utilized by locating the same between the tube, the tire rim, and the bead portions of the tire, thereby to prevent pinching of the tube by beads and also to prevent adherence of the tube to the rim by corrosion. This particular feature does away with the necessity of handling an extra piece.

Other objects of the invention are to improve generally the simplicity and efficiency of such tire and rubber and to provide a tire and rubber of this kind which are durable and economical to manufacture and convenient to manipulate.

The inventive features for the accomplishment of these and other objects are shown in two forms of inner tube, here illustrated in a tire shoe applied to a rim of a wheel.

Other objects of the invention will appear as the description proceeds; and while herein details of the invention are described, the invention is not limited to these, since many and various changes may be made without departing from the scope of the invention as claimed.

Figure 2:
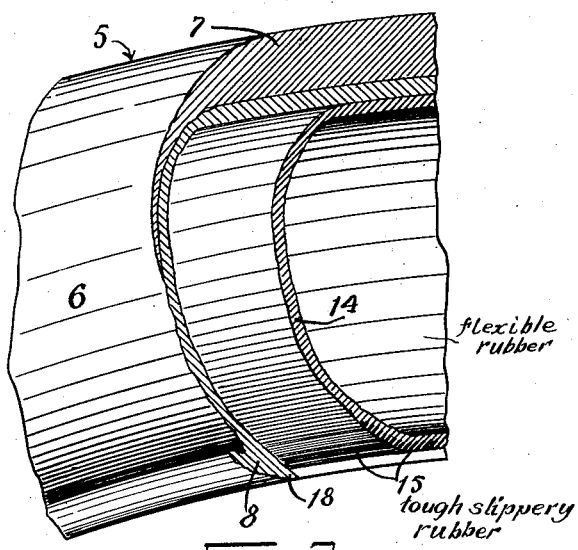
Figure 4:
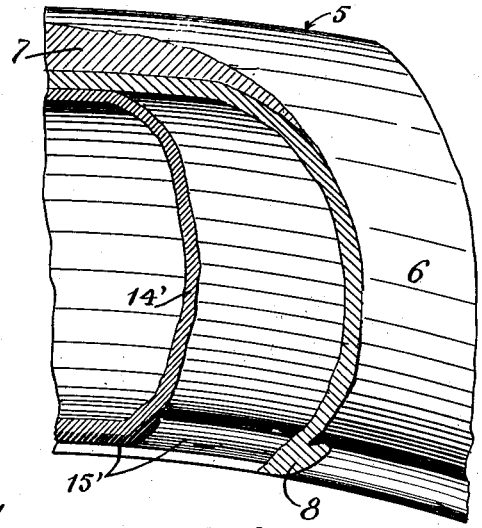
Figure 1:
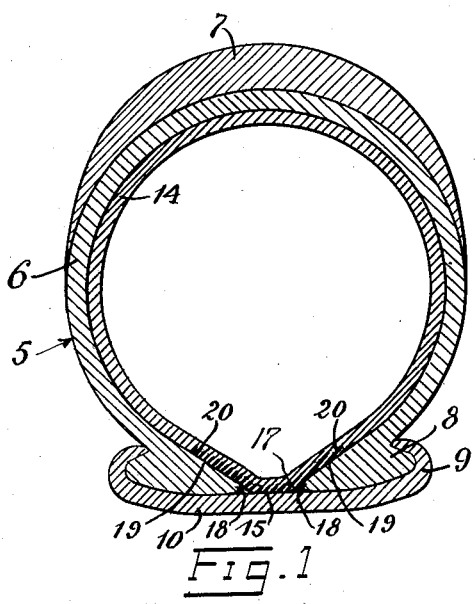
Figure 3:
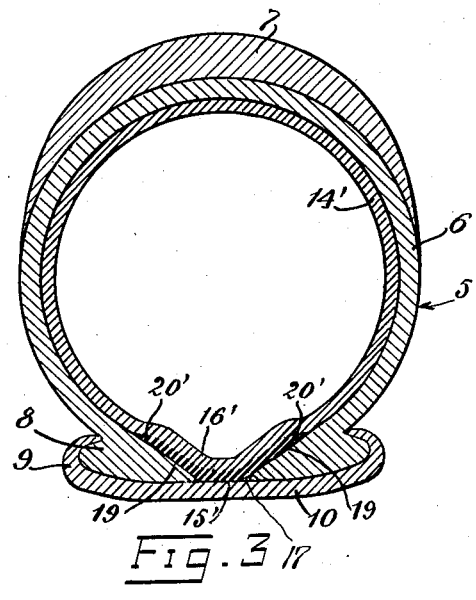

In the accompanying drawings, showing by way of example, two of many possible embodiments of the invention, Figs. 1 and 2 are respectively cross-section and side elevation of a tire showing one form of inner tube; and Figs. 3 and 4 are respectively cross-section and side elevation showing another form of inner tube.

In Figs. 1 and 2, the improved inner tube is shown in combination with a tire shoe 5, comprising a main body portion 6, a tread 7 on the outer part of the main portion, and beads 8 at the margins of the shoe adapted to be held by the flange 9 of the wheel rim 10 for holding the shoe on the rim, said beads having spaced pointed inner edges or toes disposed toward each other.

The inner tube in said shoe comprises a tube body 14 of flexible red rubber, and a white contrasting strip 15 of tough, stiff, slippery abrasion-resistant white rubber inlaid and vulcanized in the outer face of the inner part of the wall of the tube body, bridging between the toes 18 and lying in contact with the rim 10 and the wall-faces 19 of the shoe adjacent to the toes.

Said strip is stiff and slippery enough to cause its edge portions 20 to slip along said wall-faces away from the toe edges, the strip being stiff enough to prevent the strip or tube body from being caught between the toes during inflation. The strip is also resistant enough to resist the chafing wear of the toes 18 and the rim 10 during the life of the tube.

Said strip is made with some slippery substances such as mica or soapstone or both incorporated therein but is preferably made by the following formula: rubber, fifty pounds, zinc oxide, forty-five pounds, mica, two pounds, sulphur, one pound and fourteen ounces, hexamethylenetetraine, seven ounces.

It is noted that the usual reinforced loose protecting strip covering the gap 17 is omitted.

In Figs. 3 and 4 the tire shoe 5 and the rim are the same as in Figs. 1 and 2; but the strip 15' of tough, stiff, slippery abrasion-resistant rubber is laid and vulcanized on the outer face of the inner part 16' of the wall of the tube body 14', bridging the gap 17 between the toes, with its rounded exposed edges 20' in contact with the wall-faces 19 of the shoe adjacent to the toes. Said strip 15' functions the same way as the strip 15.

Both inner tubes are used, and manipulated the same as ordinary inner tubes, except that the usual flap or liner is omitted.

The contrasting white strip 15 or 15' on the red body of the tube forms an inner tube of pleasing appearance, and may serve as a convenient trade-mark.

I claim:

1. An inner tube for tires including a flexible rubber tube having secured to the inner periphery so as to form an integral part thereof, a protecting layer constituting a tire flap, said flap forming layer composed solely of a homogeneous rubberized compound equally expandible both longitudinally and transversely with the tube, more resistant to abrasion than the flexible tube, being stiffer than the flexible tube and said compound containing a material which gives to the tire flap a slippery, exposed surface.

2. An inner tube for tires comprising a flexible rubber tube having secured to its inner periphery a reinforcing strip formed solely of a homogeneous rubber stock more resistant to abrasion than the flexible tube, such stock containing mica incorporated therein whereby the exposed side of the strip is caused to be smooth and slippery to minimize friction and to prevent adherence of the tube to the tire rim.

GEORGE F. ARMSTRONG.